United States Patent
Toda (10) Patent No.: US 9,720,098 B2
(45) Date of Patent: Aug. 1, 2017

(54) POSITIONING DEVICE, POSITIONING METHOD, AND RECORDING MEDIUM

(71) Applicant: CASIO COMPUTER CO., LTD., Shibuya-ku, Tokyo (JP)

(72) Inventor: Naoto Toda, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/662,141

(22) Filed: Mar. 18, 2015

(65) Prior Publication Data

US 2015/0268351 A1    Sep. 24, 2015

(30) Foreign Application Priority Data

Mar. 20, 2014  (JP) ................................. 2014-057712

(51) Int. Cl.
| | |
|---|---|
| *H04W 4/02* | (2009.01) |
| *G01S 19/34* | (2010.01) |
| *H04W 60/04* | (2009.01) |
| *G01S 19/39* | (2010.01) |
| *G01S 19/48* | (2010.01) |

(52) U.S. Cl.
CPC .............. *G01S 19/34* (2013.01); *G01S 19/39* (2013.01); *G01S 19/48* (2013.01); *H04W 4/028* (2013.01); *H04W 60/04* (2013.01)

(58) Field of Classification Search
None
See application file for complete search history.

(56) References Cited

U.S. PATENT DOCUMENTS

| | | | |
|---|---|---|---|
| 2009/0237263 A1* | 9/2009 | Sawyer, Jr. ............. | G01S 19/14 340/686.6 |
| 2013/0041549 A1* | 2/2013 | Reeve .................. | B62D 15/025 701/28 |
| 2015/0181527 A1* | 6/2015 | Yamamura ........ | H04W 52/0251 455/456.1 |

FOREIGN PATENT DOCUMENTS

JP           2005195425 A        7/2005

* cited by examiner

*Primary Examiner* — Diane Mizrahi
(74) *Attorney, Agent, or Firm* — Holtz, Holtz & Volek PC

(57) ABSTRACT

The positioning device includes: a GPS processing unit configured to receive a signal from a GPS satellite and measure a position where the positioning device is located; a data storage unit configured to register a planned positioning point where a position is measured; and a GPS control unit configured to control timing to start up the GPS processing unit such that the GPS processing unit be ready in time for measurement at the registered planned positioning point.

8 Claims, 4 Drawing Sheets

FIG. 3

POSITIONING DEVICE, POSITIONING METHOD, AND RECORDING MEDIUM

BACKGROUND OF THE INVENTION

The present invention relates to a positioning device, a positioning method, and a recording medium.

DESCRIPTION OF THE RELATED ART

In the related art, there is a known technology in which a trajectory of a travel route is displayed on a map based on a travel history of, for example, running. For instance, JP 2005-195425 A discloses a technology in which states of a user and measurement values measured while traveling are displayed on a travel route laid on a map together with a travel history.

Meanwhile, positioning can be substantially correctly executed at a predetermined point by performing positioning by GPS, but there may be a problem in which positioning by GPS consumes a large amount of power and GPS positioning is not preferable in terms of power saving.

BRIEF SUMMARY OF THE INVENTION

Considering above, the present invention is directed to providing a positioning device, a positioning method, and a recording medium, capable of correctly performing positioning at a planned positioning point while saving power.

According to an embodiment of the present invention, a positioning device includes:

a first positioning unit configured to receive a signal transmitted from a positioning satellite and measure a position of the positioning device;

a registration unit configured to register a planned positioning point where positioning is performed by the first positioning unit; and a control unit configured to start up the first positioning unit so as to be ready in time for positioning at the planned positioning point when the positioning device moves, and control timing to drive the first positioning unit such that the first positioning unit stops positioning after passing the planned positioning point.

According to an embodiment of the present invention, a positioning method using a positioning device including a positioning unit configured to receive a signal transmitted from a positioning satellite and measure a position of the positioning device, includes:

registering a planned positioning point where positioning is performed by the positioning unit; and starting up the positioning unit such that the positioning unit becomes ready in time for positioning at the registered planned positioning point when the positioning device moves, and controlling timing to drive the positioning unit such that the positioning unit stops positioning after passing the planned positioning point.

According to an embodiment of the present invention, a recording medium records a program readable by a computer of a positioning device including a positioning unit configured to receive a signal transmitted from a positioning satellite and measure a position of the positioning device, and the program causes the computer to function as:

a registration unit configured to register a planned positioning point where positioning is performed by the positioning unit; and a control unit configured to start up the positioning unit such that the positioning unit becomes ready in time for positioning at the planned positioning point when the positioning device moves, and control timing to drive the positioning unit such that the positioning unit stops positioning after passing the planned positioning point.

DETAILED DESCRIPTION OF THE INVENTION

In the following, embodiments of the present invention will be described using the drawings. However, note that the scope of the present invention is not limited to examples illustrated in the drawings.

A positioning device 100 according to a present embodiment is a device portably carried by a user (for example, attached to an arm) and configured to sequentially store a series of positional data representing a trajectory of a user's moving route L (refer to FIG. 3) by utilizing positioning by a GPS (GPS positioning) and positioning using an autonomous navigation sensor (autonomous navigation positioning) in a combined manner.

Figure 1:
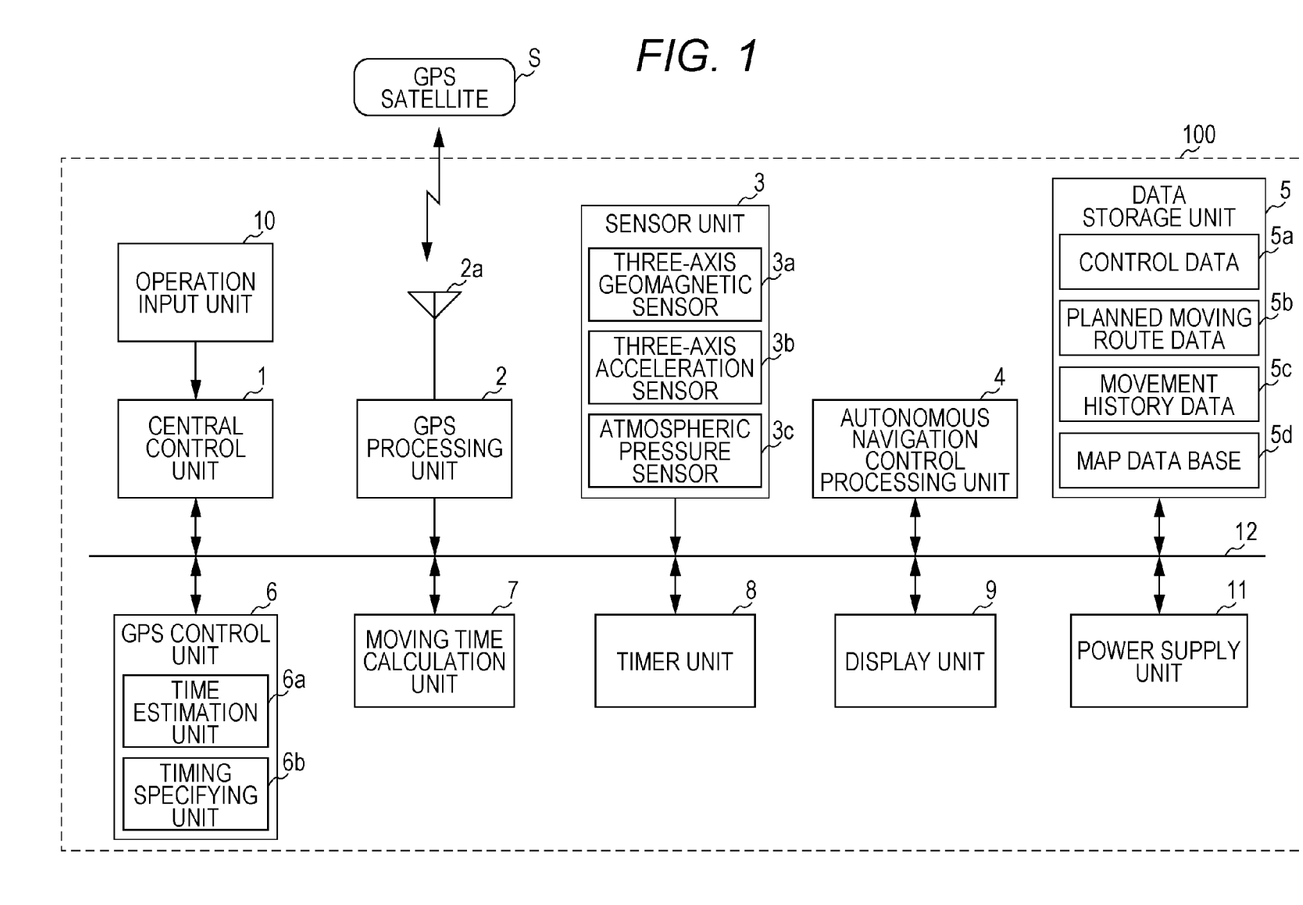
FIG. 1 is a block diagram illustrating a schematic configuration of a positioning device according to an embodiment applied with the present invention.

FIG. 1 is a block diagram illustrating a schematic configuration of the positioning device 100 according to an embodiment applied with the present invention.

As illustrated in FIG. 1, the positioning device 100 includes a central control unit 1, a GPS processing unit 2, a sensor unit 3, an autonomous navigation control processing unit 4, a data storage unit 5, a GPS control unit 6, a moving time calculation unit 7, a timer unit 8, a display unit 9, an operation input unit 10, a power supply unit 11, and so on.

Further, the central control unit 1, GPS processing unit 2, sensor unit 3, autonomous navigation control processing unit 4, data storage unit 5, GPS control unit 6, moving time calculation unit 7, timer unit 8, display unit 9, and power supply unit 11 are connected via a bus line 12.

The central control unit 1 generally controls the respective units in the positioning device 100. More specifically, the central control unit 1 includes, a Central Processing Unit (CPU), a Random Access Memory (RAM), a Read Only Memory (ROM), etc. although not illustrated. Further, the central control unit 1 executes various kinds of control operation in accordance with various kinds of programs for the positioning device 100, and displays a result of the control operation on the display unit 9 as necessary. At this point, the CPU causes a storage area inside the RAM to store various kinds of processing results, and causes the display unit 9 to display the processing result as necessary.

The RAM includes, for example, a program storage area to run a processing program and the like executed by the CPU, a data storage area to store input data and the processing results, etc. generated when the above-mentioned processing programs are executed, and so on.

The ROM stores a program stored in a form of a computer-readable program code: more specifically, a system program executable in the positioning device 100; and the various kinds of processing programs executable by the system program; data and the like used at the time of executing the various kinds of processing programs, and so on. For example, the ROM stores a program for positioning processing in which positional data for respective points on the moving route L is obtained by autonomous navigation positioning and GPS positioning.

The GPS processing unit (first positioning unit) 2 receives a signal transmitted from a Global Positioning System (GPS) satellite (positioning satellite) S, and measures a position of the positioning device.

In other words, the GPS processing unit 2 receives data transmitted from the GPS satellite S via a receiving antenna 2a. More specifically, the receiving antenna 2a receives, at predetermined timing, a GPS signal (e.g., almanac (approximate orbital information), ephemeris (detailed orbital information), etc.) transmitted from a plurality of GPS satellites (positioning satellite; only one illustrated in FIG. 1) S launched to a low-earth orbit. Then, the receiving antenna 2a outputs the received GPS signal to the GPS processing unit 2.

The GPS processing unit 2 applies demodulation processing to the GPS signal received via the receiving antenna 2a, and obtains various kinds of transmission data of the GPS satellite S. Further, the GPS processing unit 2 executes a predetermined positioning operation based on the obtained transmission data, thereby measuring an absolute two-dimensional current position (latitude and longitude) of the positioning device and obtaining positional data related to the position (for example, coordinate information of latitude and longitude) as a positioning result.

The sensor unit 3 includes, as autonomous navigation sensors, a three-axis geomagnetic sensor 3a, a three-axis acceleration sensor 3b, and an atmospheric pressure sensor 3c.

The three-axis geomagnetic sensor 3a detects magnitude of geomagnetism in each of three-axis directions orthogonal to one another. Then, the three-axis geomagnetic sensor 3a outputs a detected detection signal of each of the axes to the autonomous navigation control processing unit 4.

The three-axis acceleration sensor 3b is the autonomous navigation sensor and detects an acceleration of each of the three-axis directions orthogonal to one another. Then, the three-axis acceleration sensor 3b executes sampling of a detected detection signal in each of the axes at a predetermined frequency, and outputs the signal to the autonomous navigation control processing unit 4.

The atmospheric pressure sensor 3c is a sensor to detect an atmospheric pressure in order to obtain difference of elevation. Further, the atmospheric pressure sensor 3c outputs a detected detection signal of the atmospheric pressure to the autonomous navigation control processing unit 4.

The autonomous navigation control processing unit 4 consecutively executes positioning operation of autonomous navigation based on detection data detected by the three-axis geomagnetic sensor 3a, three-axis acceleration sensor 3b, atmospheric pressure sensor 3c, and so on.

Specifically, the autonomous navigation control processing unit 4 obtains, for example, the detection data detected by the three-axis geomagnetic sensor 3a and the three-axis acceleration sensor 3b at a predetermined sampling period, and calculates a moving direction and a moving amount of the positioning device 100 based on the detection data.

More specifically, the autonomous navigation control processing unit 4 extracts, for example, a unique output variation pattern appearing in the output from the three-axis geomagnetic sensor 3a, and calculates the moving direction of the user (positioning device).

Further, the autonomous navigation control processing unit 4 calculates the moving amount of the positioning device based on a detection result by the three-axis acceleration sensor 3b. More specifically, the autonomous navigation control processing unit 4 specifies, based on the output from three-axis acceleration sensor 3b, an acceleration component related to arm swing of an arm where the positioning device is attached, and calculates the number of times of arm swing from the mode of variation of the acceleration component, and then calculates the moving amount of the user (positioning device) by multiplying the calculated number of steps by stride length data preliminarily set.

Further, the autonomous navigation control processing unit 4 also calculates the moving amount in a height direction based on the variation of output values from the atmospheric pressure sensor 3c in addition to calculation of the above-described moving direction and moving amount.

Furthermore, the autonomous navigation control processing unit (second positioning unit) 4 adds relative vector data including the calculated moving direction and the moving amount to positional data of a position where the positioning device is located immediately before obtaining the detection data (for example, a reference point such as a start point Ps measured by GPS positioning, etc.), thereby calculating positional data to be a positioning result of the autonomous navigation. Further, the autonomous navigation control processing unit 4 consecutively calculates the positional data at a predetermined time interval, thereby obtaining positional data of the positioning device.

Additionally, a series of the positional data calculated by autonomous navigation positioning in relation to the moving route L is stored in the data storage unit 5.

Thus, the sensor unit 3 and the autonomous navigation control processing unit 4 consecutively detect the moving directions and the moving amounts of the positioning device, and integrate the moving directions and the moving amounts of the positioning device to positional data at a predetermined point of the moving route L for which a position has been preliminarily measured by the GPS processing unit 2, thereby obtaining the positional data in respective points of the moving route L.

The data storage unit 5 is formed of, for example, a non-volatile memory, in which control data for position measurement 5a, planned moving route data 5b, movement history data 5c, map database 5d, etc. are stored.

The control data 5a is the data for position measurement necessary for the positioning processing in which the positional data of each point on the moving route L is obtained. More specifically, the control data 5a may include, for example, the positional data obtained by GPS positioning, a total moving amount from the reference point (e.g., start point Ps, etc) where latest GPS positioning is executed to a current position measured by autonomous navigation positioning, a stride length data indicating an average stride length preliminarily set and entered by the user, and so on.

The planned moving route data 5b is the data related to a planned moving route of the user (positioning device) preliminarily set. More specifically, the planned moving route data 5b is correlated to, for example, map data of the map database 5d, and includes the coordinate information of each of the points included in the planned moving route.

Figure 3:
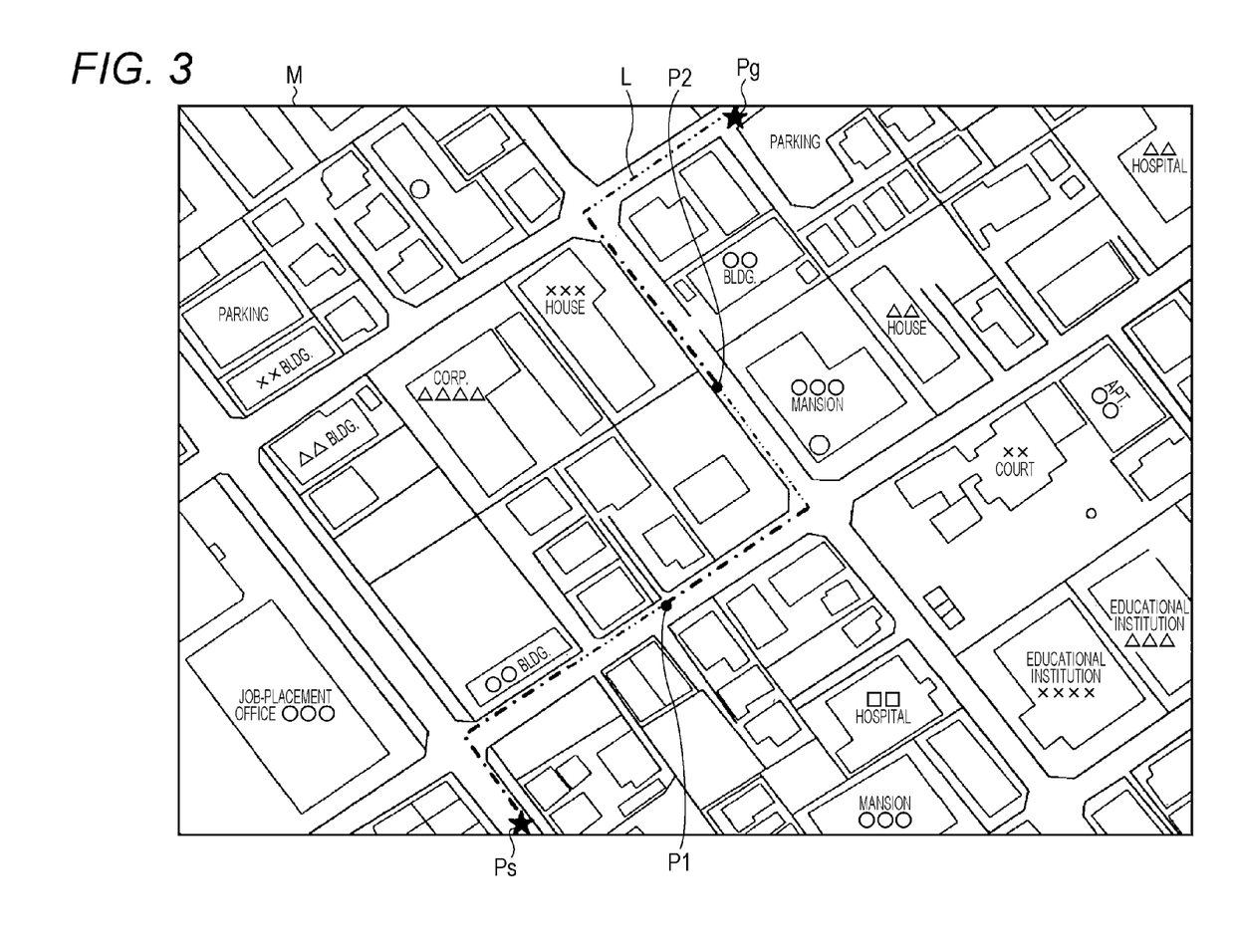
FIG. 3 is a diagram schematically illustrating a moving route related to the positioning processing in FIG. 2.

Further, the planned moving route data 5b is generated by the user preliminarily executing predetermined operation to the positioning device or an external device (not illustrated) to set the planned moving route (e.g., jogging course, etc.) of the positioning device within a predetermined map M (refer to FIG. 3). At this point, the user also specifies, on the planned moving route, a planned positioning point (e.g., start point Ps, 1 km point P1, 2 km point P2, goal point Pg, etc.) where position is measured by the GPS processing unit 2.

Meanwhile, in the case where the planned moving route data 5b is generated by using the external device, preferably, the planned moving route data 5b is transmitted to the positioning device by utilizing a predetermined communication unit (for example, short range radio communication such as Bluetooth or wire communication using a USB terminal, etc.), and then stored in the data storage unit 5.

Thus, the data storage unit 5 includes a registration unit configured to register the planned positioning point where the position is measured by the GPS processing unit 2.

The movement history data 5c is the data generated by sequentially registering the series of the positional data along the moving route L obtained by the positioning processing when the positioning device moves. More specifically, in the positioning processing, the movement history data 5c is formed by obtaining the positional data in each of the points on the moving route L measured by GPS positioning and autonomous navigation positioning.

Further, in the movement history data 5c, for example, an index number "No." that indicates an obtained order of the positional data, time data that indicates the time of obtaining the positional data, etc. are registered together with the series of the positional data.

In the map database 5d, the map data to display, on the display unit 9, the map M within a predetermined range are stored correlated to positional coordinates. More specifically, in the map database 5d, the map data representing address information such as administrative districts including prefectures, cities, towns, villages, etc. and street number, information related to buildings, facilities, shops, parks, and railways, terrain information, road information, etc. are correlated to the coordinate information such as latitudes, longitudes, altitudes, and so on.

Note that the above-described map database 5d is merely an example and not limited thereto, and contents of the information and the like stored in the database can be suitably and optionally changed.

The GPS control unit 6 controls drive of the GPS processing unit 2.

More specifically, the GPS control unit 6 includes a time estimation unit 6a and a timing specifying unit 6b.

The time estimation unit 6a estimates an amount of moving time required to move to a planned positioning point from where the positioning device is located.

Specifically, the time estimation unit (estimation unit) 6a estimates the amount of moving time required to move to the planned positioning point specified in the planned moving route data 5b based on the measurement result by the autonomous navigation control processing unit 4 (autonomous navigation positioning). More specifically, the time estimation unit 6a calculates, for example, an average speed at the time of moving from the reference point (e.g., start point Ps) of the positioning device to a point where the positional data is calculated every time the positional data in each of the points is calculated by the autonomous navigation control processing unit 4 when the positioning device moves. Further, the time estimation unit 6a calculates a distance from the point where the positional data is calculated to a next planned positioning point (e.g., 1 km point P1) specified on the planned moving route based on the calculated average speed. Then, the time estimation unit 6a calculates the amount of moving time required to move to the next planned positioning point based on the calculated average speed and the distance to the next planned positioning point.

The timing specifying unit 6b specifies timing to drive (e.g., start up and stop) the GPS processing unit 2.

Specifically, the timing specifying section (specifying unit) 6b specifies the timing to start up the GPS processing unit 2 based on the amount of moving time estimated by the time estimation unit 6a and an amount of start-up time required to start up the GPS processing unit 2. More specifically, the timing specifying unit 6b obtains the amount of moving time estimated by the time estimation unit 6a and also obtains the start-up time preliminarily stored in a predetermined storage unit (e.g., RAM, etc.). The start-up time is an amount of time required for the GPS processing unit 2 in a stopped state to be started up and become ready to perform GPS positioning. Further, the timing specifying unit 6b compares the amount of moving time estimated by the time estimation unit 6a with the amount of start-up time required to start up the GPS processing unit 2, and measures whether it is the timing to start up the GPS processing unit 2 in accordance with a result of comparison.

Here, for example, in the case where the amount of moving time estimated by the time estimation unit 6a is longer than the amount of start-up time required to start up the GPS processing unit 2, the GPS processing unit 2 can be started up at any timing. However, in order to reduce power consumption by the GPS processing unit 2, preferably, the timing to start up the GPS processing unit 2 is the timing at which the amount of moving time and the amount of start-up time are almost the same. Meanwhile, considering an estimation error or the like of the moving time, the timing specifying unit 6b may specify the timing at which an amount of time obtained by adding a predetermined period to the start-up time becomes almost the same as the amount of moving time.

Then, when the timing specifying unit 6b measures that it is the timing to start up the GPS processing unit 2, the GPS control unit 6 outputs, to the power supply unit 11, a signal commanding the power supply unit 11 to apply voltage necessary to drive the GPS processing unit 2. By this, the power supply unit 11 starts supplying power to the GPS processing unit 2, and the GPS processing unit 2 executes GPS positioning at a predetermined time interval after start-up operation (refer to FIG. 4A).

Thus, when the positioning device moves, the GPS control unit (control unit) 6 controls the timing to start up the GPS processing unit 2 such that the GPS processing unit 2 becomes ready in time for executing measurement (GPS positioning) at the planned positioning point registered in the data storage unit 5. Further, the GPS control unit 6 controls the timing to start up the GPS processing unit 2 based on the measurement result (autonomous navigation positioning) by the autonomous navigation control processing unit 4 (particularly, utilizing the estimated amount of moving time, for example).

Furthermore, the GPS control unit 6 controls the timing to stop the driving of the GPS processing unit 2 after the GPS processing unit 2 executed the position measurement (GPS positioning) at the planned positioning point.

More specifically, the GPS control unit 6 obtains a result of GPS positioning by the GPS processing unit 2, and measures whether the position measured by GPS positioning matches a coordinate of the planned positioning point. Then, when it is measured that the position measured by GPS positioning matches the coordinate of the planned positioning point, the GPS control unit 6 measures that this is the timing to stop the GPS processing unit 2 and outputs, to the power supply unit 11, a signal commanding the power supply unit 11 to stop power supply to the GPS processing unit 2. By this, the power supply unit 11 stops supplying power to the GPS processing unit 2, and the GPS processing unit 2 stops driving (refer to FIG. 4A).

The moving time calculation unit 7 calculates an amount of time spent to move between a plurality of planned positioning points.

Specifically, the moving time calculation unit (calculation unit) 7 calculates the respective amounts of time spent to move between the plurality of planned positioning points based on the time at which the position is measured by the GPS processing unit 2 in each of the plurality of planned positioning points. More specifically, the moving time calculation unit 7 obtains time information related to the time obtained by the timer unit 8 when GPS positioning is performed by the GPS processing unit 2 in each of the planned positioning points, and calculates the respective amounts of time (e.g., lap time) spent to move between the plurality of planned positioning points (for example, from the start point Ps to the 1 km point P1, from the 1 km point P1 to the 2 km point P2, etc.). The time data related to the calculated amount of time is output to, for example, the data storage unit 5 and stored in the movement history data 5c.

The timer unit 8 includes, for example, a timer, a timer unit circuit, and the like, although not illustrated, and measures current time and obtains time information. Then, the timer unit 8 outputs the obtained time information to a memory.

Note that the timer unit 8 may specify a calendar such as date and a day of week based on the obtained time information.

The display unit 9 is, for example, a liquid crystal panel, and reads image data for display, such as various kinds of information and images, and displays the image data on a display screen.

The operation input unit 10 inputs various kinds of commands with respect to the body of the positioning device 100 based on predetermined operation by the user. More specifically, the operation input unit 10 includes, for example, a power button, up/down and right/left cursor buttons, a determination button, etc. (all not illustrated).

The power supply unit 11 supplies power to the respective units included in the positioning device.

Specifically, the power supply unit 11 forms a power supply unit to supply power including, for example, various systems of rechargeable batteries (e.g., lithium ion battery, nickel-hydrogen rechargeable battery, etc.).

<Positioning Processing>

Next, the positioning processing by the positioning device 100 according to the present embodiment will be described with reference to FIGS. 2 to 4B.

Figure 2:
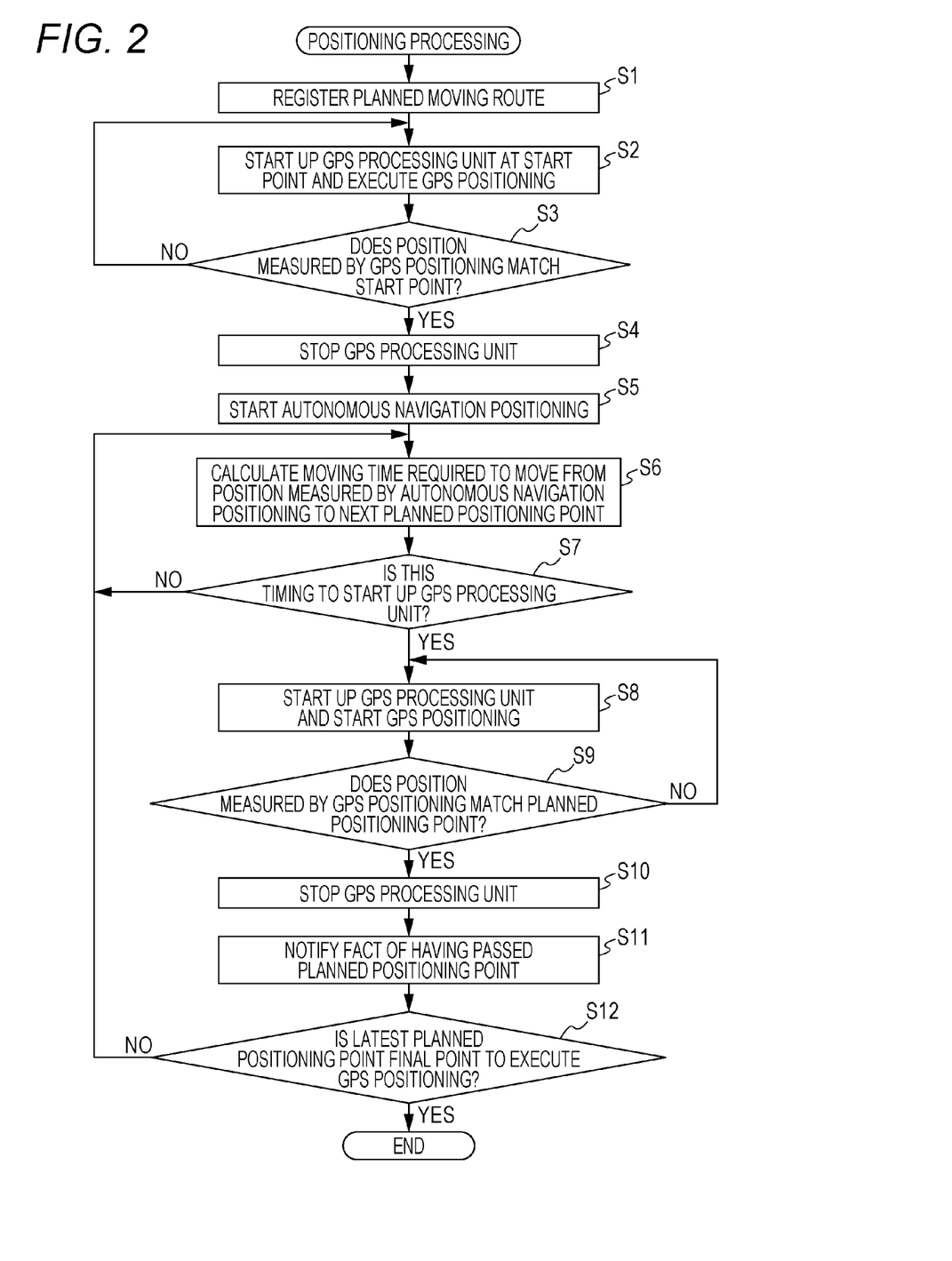
FIG. 2 is a flowchart illustrating an exemplary operation related to positioning processing by the positioning device in FIG. 1.
Figure 4A:
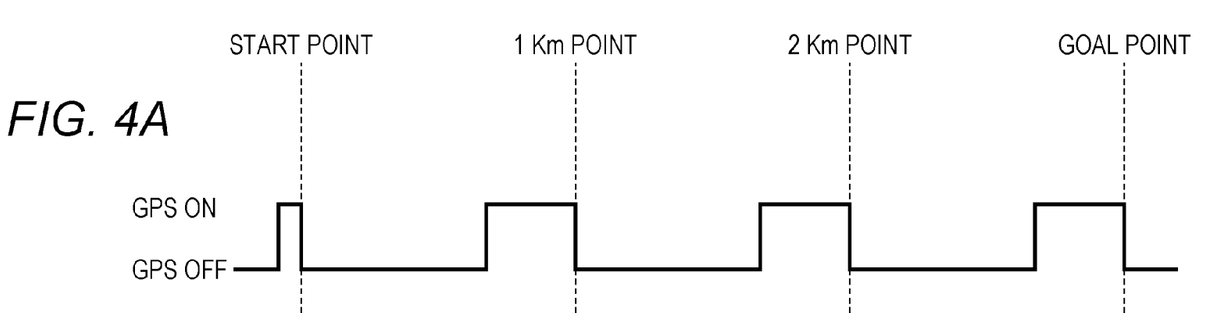
FIGS. 4A and 4B are diagrams schematically illustrating operation modes of a GPS processing unit in the positioning processing in FIG. 2.
Figure 4B:
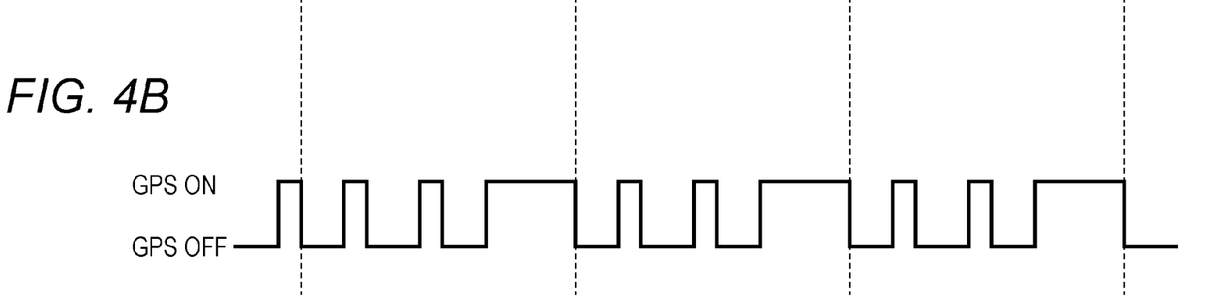

FIG. 2 is a flowchart illustrating an exemplary operation related to the positioning processing. Further, FIG. 3 is a diagram schematically illustrating the moving route L related to the positioning processing. Additionally, FIGS. 4A and 4B are diagrams schematically illustrating operation modes of the GPS processing unit 2 in the positioning processing.

Note that the planned moving route and the moving route L are substantially equal in FIG. 3, and an interval where only autonomous navigation positioning is executed is schematically indicated by a dashed-dotted line, and an interval where GPS positioning is also utilized in a combined manner is schematically indicated by a dashed-two dotted line in FIG. 3.

As illustrated in FIG. 2, the data storage unit 5 first obtains the planned moving route data 5b including the coordinate information of the planned positioning point where the position is measured by the GPS processing unit 2. The planned positioning point is, for example, preliminarily set by the user's predetermined operation at the positioning device or an external device (not illustrated) (Step S1).

Subsequently, the GPS control unit 6 starts up the GPS processing unit 2 at the start point Ps of the planned moving route, and the GPS processing unit 2 executes GPS positioning to measure the position of the positioning device (Step S2). More specifically, the GPS control unit 6 outputs, to the power supply unit 11, a signal commanding the power supply unit 11 to apply voltage necessary to drive the GPS processing unit 2, and the power supply unit 11 starts supplying power to the GPS processing unit 2. Then, the GPS processing unit 2 executes start-up operation, and executes GPS positioning at the predetermined time interval.

Next, the GPS control unit 6 obtains a result of GPS positioning by the GPS processing unit 2, and measures whether the position measured by GPS positioning matches the coordinate of the start point Ps preliminarily set in the planned moving route data 5b (step S3).

At this point, when it is measured that the position measured by GPS positioning does not match the coordinate of the start point Ps (NO in Step S3), the GPS control unit 6 repeats the determination at a predetermined time interval until determination is given that the position measured by GPS positioning matches the coordinate of the start point Ps (YES in Step S3).

When it is measured in Step S3 that the position measured by GPS positioning matches the coordinate of the start point Ps (YES in Step S3), the GPS control unit 6 outputs, to the power supply unit 11, a signal commanding the power supply unit 11 to stop power supply to the GPS processing unit 2, and the power supply unit 11 stops supplying power to the GPS processing unit 2 and stops driving the GPS processing unit 2 (Step S4).

Further, the positional data of the start point Ps measured by GPS positioning is output to the data storage unit 5 and registered in the movement history data 5c.

Further, the autonomous navigation control processing unit 4 starts autonomous navigation positioning to calculate the moving direction and the moving amount of the positioning device 100 based on the detection data from the sensor unit 3 (Step S5). More specifically, the autonomous navigation control processing unit 4 calculates the positional data to be a positioning result of the autonomous navigation by adding relative vector data including the calculated moving direction and the moving amount to the positional data of the start point Ps measured by GPS positioning. Further, the autonomous navigation control processing unit 4 executes processing to collate the position measured by autonomous navigation positioning on the planned moving route based on the planned moving route data 5b.

Next, when the positioning device moves, the time estimation unit 6a calculates the amount of moving time required to move from the position measured by autonomous navigation positioning of the autonomous navigation control processing unit 4 to the planned positioning point specified in the planned moving route data 5b (Step S6). More specifically, the time estimation unit 6a calculates, for example, the average speed when the positioning device moves from the start point Ps to the point for which the positional data has been calculated, and also calculates, based on the calculated average speed, the distance to the next planned positioning point (e.g., 1 km point P1) specified on the planned moving route from the point for which the positional data has been calculated. Then, the time estimation unit 6a calculates the amount of moving time required to move to the next planned positioning point based on the calculated average speed and the distance to the next planned positioning point.

The timing specifying unit 6b compares the amount of moving time estimated by the time estimation unit 6a with the amount of start-up time of the GPS processing unit 2 preliminarily stored in the predetermined storage unit (e.g., RAM, etc.), and measures whether this is the timing to start up the GPS processing unit 2 based on the comparison result (Step S7).

At this point, when it is measured that this is not the time to start up the GPS processing unit 2 (No in Step S7), the timing specifying unit 6b repeats the determination every time the autonomous navigation control processing unit 4 executes autonomous navigation positioning until it is measured that this is the timing to start up the GPS processing unit 2 (YES in Step S7).

When it is measured in Step S7 that this is the timing to start up the GPS processing unit 2 (YES in Step S7), the GPS control unit 6 starts up the GPS processing unit 2, and the GPS processing unit 2 executes GPS positioning to measure the position of the positioning device (Step S8). More specifically, the GPS control unit 6 outputs, to the power supply unit 11, the signal commanding the power supply unit 11 to apply voltage necessary to drive the GPS processing unit 2, and the power supply unit 11 starts supplying power to the GPS processing unit 2. Then, the GPS processing unit 2 executes the start-up operation, and executes GPS positioning at the predetermined time interval.

Then, the GPS control unit 6 obtains the result of GPS positioning by the GPS processing unit 2, and measures whether the position measured by GPS positioning matches the coordinate of the planned positioning point (e.g., 1 km point P1, etc.) set in the planned moving route data 5b (step S9).

At this point, when it is measured that the position measured by GPS positioning does not match the coordinate of the planned positioning point (NO in Step S9), the GPS control unit 6 repeats the determination at the predetermined time interval until it is measured that the position measured by GPS positioning matches the coordinate of the planned positioning point (YES in Step S9).

When it is measured in Step S9 that the position measured by GPS positioning matches the coordinate of the planned positioning point (YES in Step S9), the GPS control unit 6 outputs, to the power supply unit 11, the signal commanding the power supply unit 11 to stop power supply to the GPS processing unit 2, the power supply unit 11 stops supplying power to the GPS processing unit 2, and the GPS processing unit 2 stops driving (Step S10).

After that, the GPS control unit 6 outputs, to the display unit 9, a command to display a fact that the positioning device has passed the planned positioning point, and the display unit 9 displays the fact of having passed the planned positioning point for notification (Step S11). At this point, the moving time calculation unit 7 may calculate, based on the time measured by the timer unit 8, the respective amounts of time (e.g., lap time) spent to move between the plurality of planned positioning points (for example, from the start point Ps to 1 km point P1, etc.), and the display unit 9 may display the calculated amount of time spent for the movement for notification.

Further, the GPS processing unit 2 outputs, to the data storage unit 5, the positional data of the planned positioning points measured by GPS positioning, and the data storage unit 5 registers the positional data of the planned positioning points in the movement history data 5c.

Note that the mode of notifying the fact of having passed the planned positioning points in Step S11 is an example and is not limited thereto. For example, the mode of notification by using vibration or the like may be also applied.

Subsequently, the GPS control unit 6 measures, based on the planned moving route data 5b, whether a latest planned positioning point measured by GPS positioning of the GPS processing unit 2 is a final planned positioning point (e.g., goal point Pg, etc.) to execute GPS positioning (Step S12).

At this point, when it is measured that the latest planned positioning point is not the final planned positioning point to execute GPS positioning (NO in Step S12), the GPS control unit 6 returns to the processing in Step S6, and executes the respective processing after Step S6. More specifically, when the positioning device moves, autonomous navigation positioning is constantly executed by the autonomous navigation control processing unit 4, and GPS positioning is executed by the GPS processing unit 2 by starting up the GPS processing unit 2 to be ready in time for GPS positioning at the planned positioning points (e.g., 2 km point P2, goal point Pg, etc.) set in the planned moving route data 5b.

When it is measured in Step S12 that the latest planned positioning point is the final planned positioning point (e.g., goal point Pg, etc.) to execute GPS positioning (YES in Step S12), the positioning processing ends.

As described above, according to the positioning device 100 of the present embodiment, when the positioning device moves, the timing to start up the GPS processing unit 2 is controlled to be ready in time for GPS positioning at the registered planned positioning point. Therefore, the GPS processing unit 2 is not needed to be operated in a point where GPS positioning is unnecessary, thereby achieving power saving. In other words, the GPS processing unit 2 having high power consumption is driven only at the point necessary to execute GPS positioning, and positioning can be appropriately executed at the planned positioning point while saving power.

Further, the position in each of the points on the moving route L is measured by consecutively detecting the moving direction and the moving amount of the positioning device, and integrating the moving direction and the moving amount to the positional data at the predetermined point (autonomous navigation positioning), and the timing to start up the GPS processing unit 2 is controlled based on the measurement result of autonomous navigation positioning. Therefore, power saving and correct positioning in each of the planned positioning point can be achieved by using autonomous navigation positioning and GPS positioning in a combined manner. More specifically, the amount of moving time required to move to the planned positioning point is estimated based on the measurement result by autonomous navigation positioning, and the timing to start up the GPS processing unit 2 is specified based on the estimated amount of moving time and the amount of start-up time required to start up the GPS processing unit 2. By this, the GPS processing unit 2 can be driven only at the point necessary to execute GPS positioning, and as a result, positioning at the planned positioning point can be appropriately executed while saving power.

Further, since the timing to stop the GPS processing unit 2 is controlled after the GPS processing unit 2 measures the position at the planned positioning point, the timing to drive the GPS processing unit 2 having high power consumption can be more precisely controlled and power can be more appropriately saved.

Additionally, the planned positioning point can be easily set on the planned moving route of the positioning device within the predetermined map M. Also, since respective amounts of time spent to move between the plurality of planned positioning points are calculated based on the time at which each of the positions of the plurality of planned positioning points is measured, a lap time of jogging or the like can be properly measured, for example, and usability can be more improved.

Note that the present invention is not limited to the above-described embodiment and various kinds of improvements and design changes may be made in the scope without departing from the gist of the present invention.

For example, according to the above embodiment, the positional data measured by autonomous navigation positioning may be corrected based on the positional data at the planned positioning point and the planned moving route data 5b after the GPS processing unit 2 executes GPS positioning at the planned positioning point. Further, the GPS processing unit 2 may be periodically driven between the planned positioning points (refer to FIG. 4B) to improve accuracy of autonomous navigation positioning. By this, the positional data measured by autonomous navigation positioning can be appropriately corrected by using the result of GPS positioning by the GPS processing unit 2, and the timing specifying unit 6b can measure the timing to start up the GPS processing unit 2 with higher accuracy.

Further, according to the above embodiment, autonomous navigation positioning is constantly executed in the positioning processing, but this is merely an example and autonomous navigation positioning is not constantly needed to be executed, and whether to provide the autonomous navigation control processing unit 4 can be suitably and optionally changed. More specifically, in the case where the moving speed of the user (positioning device) is already known, for example, the timing to start up the GPS processing unit 2 may be specified by calculation using the moving speed, and the GPS processing unit 2 may be started up after a predetermined time passes from the start point Ps to execute GPS positioning at the planned positioning point.

Additionally, according to the above embodiment, the amount of moving time required to move to the planned positioning point is estimated, and the timing to start up the GPS processing unit 2 is specified based on the estimated amount of moving time and the start-up time required to start up the GPS processing unit 2. However, for example, the timing to start up the GPS processing unit 2 may be specified based on the distance to the planned positioning point from the position measured by autonomous navigation positioning, collating the positional data measured by autonomous navigation positioning on the planned moving route when the positioning device moves.

Further, according to the above embodiment, the respective amounts of time (e.g., lap time) required to move between the plurality of planned positioning points (e.g., from start point Ps to 1 km point P1, etc.) are calculated, but this is merely an example and it is not necessary to calculate the amount of time required to move between the plurality of planned positioning points, and whether to provide the moving time calculation unit 7 can be suitably and optionally changed.

Also, the configuration of the positioning device 100 exemplified in the above embodiment is an example and not limited thereto.

Additionally, according to the above embodiment, the functions as the registration unit and the control unit are configured to be implemented by driving the data storage unit 5 and the GPS control unit 6 under the control of the CPU of the central control unit 1, but not limited thereto, the functions may be configured to be implemented by a predetermined program or the like executed by the central control unit 1.

In other words, the program including a registration processing routine and a control processing routine is preliminarily stored in a program memory (not illustrated) to store the program. Further, the registration processing routine may cause the CPU of the central control unit 1 to function as a unit to register the planned positioning point where the position is measured by the positioning unit. Further, the control processing routine may cause the CPU of the central control unit 1 to function as a unit to control the timing to start up the positioning unit such that the positioning unit becomes ready in time for measurement at the registered planned positioning point when the positioning device moves.

In the same manner, the estimation unit, specifying unit, and calculation unit may also be configured to be implemented by a predetermined program or the like executed by the CPU of the central control unit 1.

Further, as a computer readable medium to store the program to execute the above-described respective processing, a non-volatile memory such as a flash memory, and a portable recording medium such as CD-ROM may be applicable, besides the ROM, hard disk, and so on. In addition, a carrier wave (carrier) may be applied as a medium to provide data of the program via a predetermined communication line.

While some embodiments have been described, the scope of the invention is not limited to the above-described embodiments, and includes the scope of the invention recited in the scope of claims and the scope equivalent thereto.

In the following, the inventions recited in the scope of claims initially attached to the request for the present application are provided as Supplementary Note. The numbers assigned to the claims recited in Supplementary Note conform to the scope of claims initially attached to the request for the present application.

SUPPLEMENTARY NOTE

<Claim 1>

A positioning device, including:

a first positioning unit configured to receive a signal transmitted from a positioning satellite and measure a position of the positioning device;

a registration unit configured to register a planned positioning point where positioning is performed by the first positioning unit; and a control unit configured to start up the first positioning unit so as to be ready in time for positioning at the planned positioning point when the positioning device moves, and control timing to drive the first positioning unit such that the first positioning unit stops positioning after passing the planned positioning point.

<Claim 2>

The positioning device according to claim 1, further including:

a second positioning unit configured to consecutively detect a moving direction and a moving amount of the positioning device to measure a position, wherein the control unit is configured to control timing to start up the first positioning unit based on a positioning result by the second positioning unit.

<Claim 3>

The positioning device according to claim 2, wherein the control unit includes:

an estimation unit configured to estimate a moving time required to move to the planned positioning point based on the positioning result by the second positioning unit; and a specifying unit configured to specify timing to start up the first positioning unit based on the moving time estimated by the estimation unit and a start-up time required to start up the first positioning unit.

<Claim 4>

The positioning device according to claim 1, wherein the control unit is further configured to control timing to stop the first positioning unit after positioning at the planned positioning point by the first positioning unit.

<Claim 5>

The positioning device according to claim 1, wherein the planned positioning point is set on a planned moving route of the positioning device within a predetermined map.

<Claim 6>

The positioning device according to claim 1, wherein the registration unit is further configured to:

register a plurality of the planned positioning points; and further include a calculation unit to calculate respective amounts of time spent to move between the plurality of planned positioning points based on time at which the position is measured by the first positioning unit in each of the plurality of planned positioning points.

<Claim 7>

A positioning method using a positioning device including a positioning unit configured to receive a signal transmitted from a positioning satellite and measure a position of the positioning device, including:

registering a planned positioning point where positioning is performed by the positioning unit; and starting up the positioning unit such that the positioning unit becomes ready in time for positioning at the registered planned positioning point when the positioning device moves, and controlling timing to drive the positioning unit such that the positioning unit stops positioning after passing the planned positioning point.

<Claim 8>

A recording medium to record a program readable by a computer of a positioning device including a positioning unit configured to receive a signal transmitted from a positioning satellite and measure a position of the positioning device, the program causing the computer to function as:

a registration unit configured to register a planned positioning point where positioning is performed by the positioning unit; and a control unit configured to start up the positioning unit such that the positioning unit becomes ready in time for positioning at the planned positioning point when the positioning device moves, and control timing to drive the positioning unit such that the positioning unit stops positioning after passing the planned positioning point.

What is claimed is:

1. A positioning device, comprising:
   a processor; and
   a memory storing instructions that, when executed by the processor, control the processor to:

estimate a moving time required to move to a planned positioning point from where the positioning device is currently located based on a positioning result by an autonomous navigation unit, the autonomous navigation unit being configured to obtain a plurality of pieces of positional data of the positioning device;

determine, as a beginning timing to drive a positioning unit, a timing when the estimated moving time is almost the same as a required start-up time to start up the positioning unit, the positioning unit being configured to receive a signal transmitted from a positioning satellite and measure a position of the positioning device, start up the positioning unit at the determined beginning timing, begin measuring the position of the positioning device at certain intervals when the required start-up time elapsed after the determined beginning timing, determine an ending timing to drive the positioning unit when the measured position matches the planned positioning point, and stop measuring the position of the positioning device by using the positioning unit, while continuing measuring the position of the positioning device by using the autonomous navigation unit, at the determined ending timing.

2. The positioning device according to claim 1, wherein the instructions further control the processor to determine the beginning timing using moving directions and moving amounts obtained based on data detected by the autonomous navigation unit.

3. The positioning device according to claim 1, wherein the planned positioning point is located on a moving route of the positioning device, the moving route being determined prior to a timing when driving of the positioning unit is started.

4. The positioning device according to claim 1,
   wherein the memory is further configured to store a plurality of the planned positioning points; and
   wherein the instructions further control the processor to calculate respective amounts of time spent to move between the plurality of the planned positioning points based on a plurality of ending timings respectively determined for the plurality of the planned positioning points.

5. The positioning device according to claim 1, wherein the instructions further control the processor to output data indicating that the positioning device passed the planned positioning point.

6. The positioning device according to claim 1, further comprising the positioning unit and the autonomous navigation unit.

7. A positioning method using a positioning device, the method comprising:
   estimating a moving time required to move to a planned positioning point from where the positioning device is currently located based on a positioning result by an autonomous navigation unit, the autonomous navigation unit being configured to obtain a plurality of pieces of positional data of the positioning device;

determining, as a beginning timing to drive a positioning unit, a timing when the estimated moving time is almost the same as a required start-up time to start up the positioning unit, the positioning unit being configured to receive a signal transmitted from a positioning satellite and measure a position of the positioning device;

starting up the positioning unit at the determined beginning timing;

beginning measuring the position of the positioning device at certain intervals when the required start-up time elapsed after the determined beginning timing;

determining an ending timing to drive the positioning unit when the measured position matches the planned positioning point; and stopping measurement of the position of the positioning device by using the positioning unit, while continuing measuring the position of the positioning device by using the autonomous navigation unit, at the determined ending timing.

8. A non-transitory computer-readable recording medium having stored thereon a program that is executable by a computer of a positioning device, the program causing the computer to execute functions comprising:

estimating a moving time required to move to a planned positioning point from where the positioning device is currently located based on a positioning result by an autonomous navigation unit, the autonomous navigation unit being configured to obtain a plurality of pieces of positional data of the positioning device;

determining, as a beginning timing to drive a positioning unit, a timing when the estimated moving time is almost the same as a required start-up time to start up the positioning unit, the positioning unit being configured to receive a signal transmitted from a positioning satellite and measure a position of the positioning device;

starting up the positioning unit at the determined beginning timing;

beginning measuring the position of the positioning device at certain intervals when the required start-up time elapsed after the determined beginning timing;

determining an ending timing to drive the positioning unit when the measured position matches the planned positioning point; and stopping measurement of the position of the positioning device by using the positioning unit, while continuing measuring the position of the positioning device by using the autonomous navigation unit, at the determined ending timing.

* * * * *